W. M. BEATTY.
VEHICLE SPRING.
APPLICATION FILED APR. 12, 1920.
1,396,549.
Patented Nov. 8, 1921.
2 SHEETS—SHEET 2.
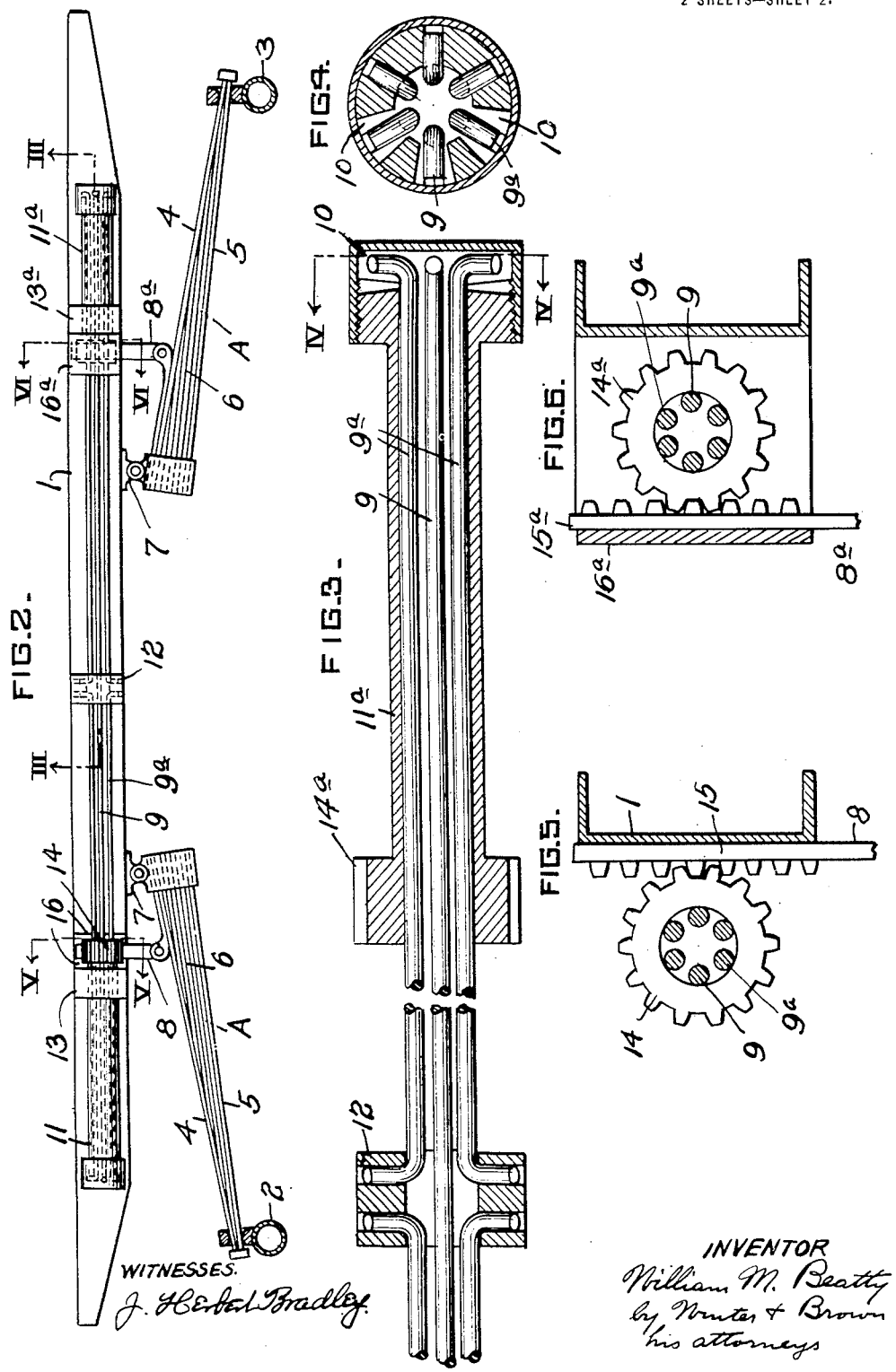
WITNESSES:
J. Herbert Bradley
INVENTOR
William M. Beatty
by Wouter & Brown
his attorneys

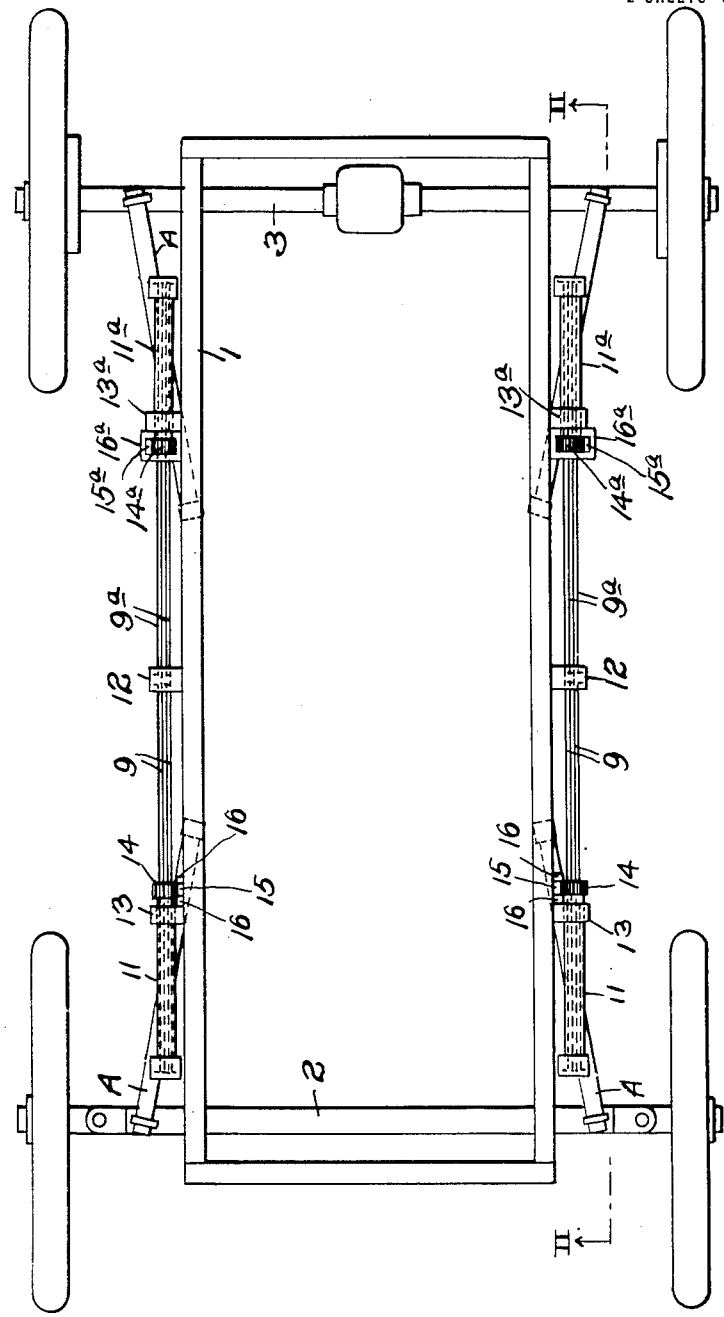

UNITED STATES PATENT OFFICE.

WILLIAM M. BEATTY, OF PITTSBURGH, PENNSYLVANIA.

VEHICLE-SPRING.

1,396,549.

Specification of Letters Patent.

Patented Nov. 8, 1921.

Application filed April 12, 1920. Serial No. 373,628.

*To all whom it may concern:*

Be it known that I, WILLIAM M. BEATTY, a resident of Pittsburgh, in the county of Allegheny and State of Pennsylvania, have invented a new and useful Improvement in Vehicle-Springs, of which the following is a specification.

The object of the invention is to provide vehicles, such as automobiles, trucks and the like, with compensating springs so constructed and arranged that relative movements between one wheel and the vehicle body, or between one axle and the vehicle body, may be resisted or counteracted by a force tending to effect relative movements between another wheel or axle and another portion of the body, whereby objectionable rocking or bouncing of one portion of a vehicle body may be minimized.

The invention is illustrated in the accompanying sheets of drawings of which Figure 1 is a somewhat diagrammatic plan view of a vehicle chassis showing the invention applied thereto; Fig. 2 a vertical sectional view taken on the line II—II, Fig. 1; Fig. 3 a detached sectional view to an enlarged scale taken on the line III—III, Fig. 2; Fig. 4 a sectional view taken on the line IV—IV, Fig. 3; and Figs. 5 and 6 sectional views taken on the lines V—V, and VI—VI, Fig. 2.

The invention is illustrated in its adaptability to resist relative movements between one end of a vehicle body and the adjacent axle by applying a force between the opposite end of the vehicle body and the other axle tending to effect a similar movement between such other end and axle. The vehicle body is represented by a frame 1 supported, through yielding connections, by a front axle 2 and rear axle 3. While the yielding supporting connections may, as far as some features of the invention are concerned, be of any suitable construction, each connection shown herein includes an improved leaf spring A, the same form of spring being used for the front as for the rear axle. The spring comprises continuous upper and lower resilient plates 4 and 5, between which there are arranged a plurality of shorter plates 6 of different lengths, the general construction being such that the spring is of gradually diminishing size and resisting power from the point of its connection to the body 1 to its connection to the axle. By providing the leaf spring with a continuous top plate 4, or in other words with continuous leaves on both sides of the spring, the strength of the spring is increased and considerable resistance to rebound is afforded. As previously stated, the end of the spring is pivoted to the body 1. This may be done by a bracket 7 attached to the body. Acting intermediately of the ends of the spring A and the body 1 there is a body-supporting member 8, the construction of which will be presently explained.

The means for counteracting relative movements between one end of the vehicle body and an axle in the manner explained above preferably includes a torsional spring extending lengthwise of the vehicle body and attached thereto. Connections are provided between the front axle and the forward end of such spring for applying torsional stress to the spring when the front axle and forward end of the body move relatively to each other, and similar connections are provided between the rear axle and the rear end of the spring for converting the torsional stress so applied to the front end of the spring into a force adapted to effect an opposite movement between the rear end of the body and the rear axle. These two connections are preferably of similar construction, and are so shown in the drawings, so that the same action takes place when the initial relative movement is between the rear end of the body and the rear axle as has just been explained with reference to the initial movement between the front end of the body and the front axle.

Referring to the illustrative embodiment of the invention, the torsional spring may, and preferably does, take the form of a plurality of resilient rods 9 and 9ª, which may have their outer ends turned laterally to lie in suitable grooves 10 formed in the heads of casings 11, 11ª and 12. The size and number of rods used may vary according to load requirements and other conditions of service. As shown in the drawing there are three rods 9 which extend substantially the full length of the body or frame 1 and are attached at their ends to casings 11 and 11ª, which are rotatably mounted in bearings 13 and 13ª, respectively, attached to the frame 1. The rods 9ª extend but half the length of the body 1, and have their intermediate ends turned laterally to lie in suitable grooves formed in a casing 12, which is firmly and immovably attached to the central portion of the body 1. The rods 9ª, having their intermediate ends thus attached to a fixed casing, tend to restore the longer rods 9 to their normal positions after they have been subjected to unbalanced stress application.

For applying torsional stress to the spring when an axle moves with relation to one end of the body, the rotatable casing 11 is preferably provided with a pinion 14 which meshes with a rack 15 mounted for vertical reciprocation between the body 1 and side guides 16 secured to the body. In a similar manner the casing 11ª is provided with a pinion 14ª adapted to mesh with a rack 15ª, which rack is held in mesh with the pinion by means of suitable strap or guide 16ª attached to the frame 1. It will here be observed that the racks 15 and 15ª act upon the opposite sides of the torsional spring. They are shown as being attached to the supports 8 and 8ª, which are pivotally connected to the top of the leaf springs A intermediate their ends.

It will be observed from Fig. 4 that the laterally turned ends of the rods 9 and 9ª lie in grooves 10 of different widths, and that the sides of such ends are at different distances from the sides of the grooves. The effect of this construction is that all of the rods are not simultaneously called upon to resist stress application, but are brought into play in succession according to the load or resistance requirements.

In operation, let it be supposed that the axle 2 has moved upwardly by reason of the front wheels having moved over an irregularity in a road. This upward movement of the front axle is resisted partly by the supporting spring attached to it, but the movement of the springs necessarily causes an upward movement of the support 8 and rack 15 attached to it. The vertical movement of the rack causes the pinion 14 to rotate with the result that the casing 11 is rotated and torsional stress is applied to the rods 9 and 9ª. The stress applied to the rods 9ª is directly resisted at the casing 12, while that applied to the rods 9 is transmitted to the casing 11ª and causes such casing to rotate in its bearing 13ª. The rotation of the casing 11ª causes the rack 15ª to move downwardly and as a result thereof tends to effect a spread between the rear axle 2 and the rear end of the car. The net result is that the initial stress or relative movement between body and axle is resisted in such a manner that the rocking of the vehicle body is very largely minimized. In case the initial relative movement, is between the rear axle 3 and the front end of the body, the effect is the same as just explained with reference to the front axle, the stress applying connections being the same for each end of the torsional spring with the exception that they act upon opposite sides of the spring.

Any desired number of torsional springs may be used for each vehicle. However, in the drawings one spring is shown as being attached to each side of the vehicle body.

According to the provisions of the patent statute, I have described the principle and operation of my invention, together with the construction which I now consider to represent the best embodiment thereof. However, I desire to have it understood that, within the scope of the appended claims, my invention may be practised by other forms or constructions than that specifically shown and described.

I claim:

1. In a vehicle, the combination of front and rear axles, a body, yielding supporting connections between the front and rear of the body and said axle, a torsional spring extending longitudinally of said body, and oppositely-acting stress-applying connections between the ends of said spring and said axles for counteracting between one axle and the end of the body adjacent thereto a relative movement between the other axle and the other end of the body.

2. In a vehicle, the combination of front and rear axles, a body, yielding body-supporting connections between the front and rear of the body and said axles, a torsional spring attached to the body and extending longitudinally thereof, a connection between the front axle and the forward end of said spring for applying torsional stress to the spring when the front axle and forward end of the body move relatively to each other, and a connection between the rear axle and the rearward end of said spring for applying torsional stress to the spring in a direction opposite to said first-mentioned stress-applying connection.

3. In a vehicle, the combination of front and rear axles, a body, yielding body-supporting connections between the front and rear of the body and said axles, casings rotatably mounted one on each end of said body on axes extending longitudinally of the body, a plurality of resilient rods attached at their ends to said casings, and oppositely-acting connections between said axles and casings for rotating the latter as a consequence of a relative movement between an axle and an end of said body.

4. In a vehicle, the combination of front and rear axles, a body, leaf springs pivotally attached at their ends one to each end of the body and attached at their other ends one to each of said axles, casings rotatably mounted one on each end of said body on axes extending longitudinally of the body, a plurality of resilient rods attached at their ends to said casings, and oppositely-acting connections between the ends of said springs and said casings for rotating the latter when said springs swing on their pivot points.

In testimony whereof, I have hereunto set my hand.

WILLIAM M. BEATTY.

Witnesses:
PAUL N. CRITCHLOW,
ALICE A. TRILL.